US012281772B2

(12) United States Patent
Dreßler et al.

(10) Patent No.: US 12,281,772 B2
(45) Date of Patent: Apr. 22, 2025

(54) LIGHTING MODULE AND LIGHTING METHOD FOR GENERATING TWO DIFFERENT LIGHTING EFFECTS

(71) Applicant: Hella GmbH & Co. KGaA, Lippstadt (DE)

(72) Inventors: Björn Dreßler, Menden (DE); Fabian Schüler, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/510,219

(22) Filed: Nov. 15, 2023

(65) Prior Publication Data

US 2024/0077185 A1 Mar. 7, 2024

Related U.S. Application Data

(63) Continuation of application No. PCT/EP2022/061476, filed on Apr. 29, 2022.

(30) Foreign Application Priority Data

May 31, 2021 (DE) ..................... 10 2021 113 978.3

(51) Int. Cl.
*F21S 41/663* (2018.01)
*F21S 41/20* (2018.01)
(Continued)

(52) U.S. Cl.
CPC ........... *F21S 41/663* (2018.01); *F21S 41/255* (2018.01); *F21S 41/285* (2018.01); *F21S 41/365* (2018.01); *F21W 2107/10* (2018.01)

(58) Field of Classification Search
CPC ...... F21S 41/663; F21S 41/365; F21S 41/255; F21S 41/285
See application file for complete search history.

(56) References Cited

U.S. PATENT DOCUMENTS 10,082,272 B2 * 9/2018 Gromfeld ............ F21S 41/265
11,022,742 B2 * 6/2021 Ohtawa ................ F21S 43/236
(Continued)

FOREIGN PATENT DOCUMENTS

DE 102018110793 A1 11/2019
EP 3521691 A1 8/2019
(Continued)

*Primary Examiner* — Matthew J. Peerce
(74) *Attorney, Agent, or Firm* — Husch Blackwell LLP

(57) ABSTRACT

A lighting module is provided for generating two different lighting effects, and includes at least one light source, a first primary optical element, a second primary optical element, and a projection lens. The first primary optical element contains a diffusion surface diffusing the light beams from the light source to homogenously light the projections lens for a first lighting effect. The first primary optical element has a first reflector and second reflector. The first reflector reflects light beams from the light source in a boundary area between the diffusion surface and another section of the lighting module onto the second reflector to direct these light beams through the diffusion surface onto the projection lens. The second primary optical element directs light beams from the light source onto the projection lens to light the projection lens for a second lighting effect.

9 Claims, 5 Drawing Sheets

(51) Int. Cl.

| | |
|---|---|
| ***F21S 41/255*** | (2018.01) |
| ***F21S 41/365*** | (2018.01) |
| ***F21W 107/10*** | (2018.01) |

(56) References Cited

U.S. PATENT DOCUMENTS

| | | | | |
|---|---|---|---|---|
| 11,732,855 | B2 * | 8/2023 | Han | F21S 43/243 362/219 |
| 11,781,733 | B2 * | 10/2023 | Qiu | F21S 41/36 362/235 |
| 2002/0149946 | A1 | 10/2002 | Malone et al. | |
| 2011/0261570 | A1 | 10/2011 | Okada et al. | |
| 2014/0036526 | A1 * | 2/2014 | Sato | F21S 41/322 362/518 |
| 2019/0346612 | A1 | 11/2019 | Herlin et al. | |
| 2021/0010653 | A1 | 1/2021 | Hermitte et al. | |

FOREIGN PATENT DOCUMENTS

| | | | |
|---|---|---|---|
| EP | 3604910 | A1 | 2/2020 |
| KR | 1020190036807 | A | 4/2019 |
| WO | 2018192963 | A1 | 10/2018 |
| WO | 2021078115 | A1 | 4/2021 |

* cited by examiner

LIGHTING MODULE AND LIGHTING METHOD FOR GENERATING TWO DIFFERENT LIGHTING EFFECTS

CROSS REFERENCE

This application claims priority to PCT Application No. PCT/EP2022/061476, filed Apr. 29, 2022, which itself claims priority to German Application No. 10 2021 113978.3, filed May 31, 2021, the entireties of both of which are hereby incorporated by reference.

FIELD OF THE INVENTION

The invention relates to a lighting module and method, and more particularly to a lighting module and lighting method for generating two different lighting effects.

BACKGROUND OF THE INVENTION

Lighting modules are used in particular in vehicles for different effects, e.g. low beam functions, with which a vehicle's visibility is ensured, and traffic signs can be distinguished, even at night or when it is dark outside, or a high beam function, with which the area in front of the vehicle is brightly lit.

There are lighting modules for the low beam function that have lens elements with a diffusing surface structure for a homogenous light distribution. Lighting modules with low beam functions, so-called "appearance modules," are not very bright, to prevent blinding passers-by or oncoming traffic.

Because of their specific surface structures, lighting modules for the low beam function are not normally designed to generate a focused light, as is the case with the high beam function.

Moreover, the installation space for vehicle lamps is limited.

BRIEF SUMMARY OF THE INVENTION

This forms the basis for the invention, the object of which is to create headlamps optimized for the installation space, with which two different lighting effects can be generated.

A first aspect of the invention relates to a lighting module with which two different lighting effects can be generated. The lighting module has at least one light source, a first primary optical element, a second primary optical element, and a projection lens. The first primary optical element has a diffusion surface configured to diffuse light beams from the at least one light source, to homogenously light the projection lens for a first lighting effect. The first primary optical element also has a first reflector and a second reflector, the first of which is configured to reflect light beams from the at least one light source in a boundary area between the diffusion surface and another section of the lighting module onto the second reflector to direct these through the diffusion surface onto the projection lens. The second primary optical element is configured to direct, i.e. focus, the light beams from the at least one light source onto the projection lens for a second lighting effect.

A lighting effect in the context of the present invention forms a beam of light from a lighting module in a specific shape, i.e. for a specific appearance. A lighting effect can comprise a high beam function for a vehicle in accordance with the regulations for headlamps.

A diffusion surface in the context of the present invention is a region in a primary optical element located downstream of a light source, which diffuses the light from the light source, i.e. a region that expands the cross section of the light beams, in particular through diffusion and/or deflection.

A focused lighting or focused beam direction in the context of the present invention refers to beam direction in accordance with a predefined trajectory, without diffusion. In particular, a focused lighting can be focused such that a focused lighting effect is obtained, in which light beams only pass through a portion of the projection lens.

The lighting module herein contains two different primary optical elements, which can be integral components with different optical properties, with which light can be directed in different ways onto a projection lens.

The first primary optical element in the lighting module is configured in particular for a low beam function, lighting the projection lens homogenously for a diffused lighting effect.

The diffused lighting effect generated with the first primary optical element is generated by a diffusion surface on the first primary optical element, in which the first primary optical element has a surface with a diffusing structure directed toward the projection lens, such that light beams passing through the first primary optical element light the projection lens homogenously.

The first primary optical element also has a first reflector and second reflector. The first reflector is located in a boundary area between the diffusion surface and another section in the lighting module, and can be configured for total reflection of light beams, such that no light is emitted outside the diffusion surface.

The first reflector reflects light beams toward the second reflector in the first primary optical element, which then reflects this light into the diffusion surface, such that it then exits the first primary optical element toward the projection lens. This path from the first reflector to the second reflector expands the cross section of the light beam directed into the first primary optical element, thus lighting the entire projection lens.

The second primary optical element in the lighting module focuses light onto the projection lens, or a portion thereof, for a high beam function. The second primary optical element is configured to direct light from the light source in a predefined path onto the projection lens without diffusion. The second primary optical element therefore has no diffusion surface.

By switching between the first and second primary optical elements in the lighting module presented herein, two different lighting effects, or lighting functions can be obtained with a projection lens, or on the same surface area.

The first reflector can form the boundary between the diffusion surface and the other region.

The first reflector can comprise all of the regions in the first primary optical element other than the diffusion surface, such that all of the light beams that do not strike the diffusion surface directly are reflected by the first reflector onto the second reflector, and subsequently through the diffusion surface. Because of this, the design of the first primary optical element can assume any shape, independently of the shape of the diffusion surface.

Furthermore, the first reflector and/or second reflector can be configured to reflect the light from the at least one light source in a total reflection.

A total reflection of all of the light entering it ensures that all of the light from the light sources are directed toward the projection lens, thus preventing performance losses or lighting any areas outside the projection lens. The lighting module can also be configured to direct the light beams from the at least one light source exclusively through the first primary optical element for a low beam function, and exclusively through the second primary optical element for a high beam function.

The two primary optical elements according to the invention make it possible to switch quickly and easily between different lighting effects, in that a diffused, and therefore dim, lighting effect is obtained with the first primary optical element, and a focused and bright lighting effect is obtained with the second primary optical element.

The at least one light source can also comprise a first lighting unit for the first primary optical element and a second lighting unit for the second primary optical element.

To switch between the first primary optical element and the second primary optical element, it is therefore possible to switch between a first light and second light, the light beams of which are directed toward either the first primary optical element or second primary optical element by waveguides and/or moving upstream reflectors.

The at least one light source can also have at least one collimator configured to narrow the light beams from the at least one light source before and, optionally, after entering the first primary optical element, such that the light beams strike the boundary area and the diffusion surface, with the first reflector and second reflector configured to diffuse light beams striking the boundary area as they pass through the first primary optical element, thus lighting the entire projection lens homogenously for the first lighting effect.

To diffuse light, i.e. enlarge the area the light illuminates, the reflector can be curved, in particular with a concave shape.

Using a collimator to narrow the light beams from the light source results in a broad distribution of the light beams prior to entering the first or second primary optical elements. The collimator can be configured in this case to direct light onto predefined areas in the first primary optical element, e.g. boundary areas and diffusion surfaces, or in the second primary optical element, e.g. predefined refraction points.

The first primary optical element can also contain a diffusion surface configured to diffuse light beams from the at least one light source, such that they light the entire projection lens homogenously.

To light the entire projection lens in the lighting module presented herein homogenously, the shape of the diffusion surface can correspond to the shape of the projection lens, such that the light beams passing through the diffusion surface strike the entire surface of the projection lens. The shape of the projection lens can also correspond to the shape of the diffusion surface, such that the light beams passing through the diffusion surface strike the entire surface of the projection lens.

The diffusion surface can also have a structure with a predefined or statistically distributed diffusion effect.

A predefined diffusion effect on a surface area of the diffusion surface according to the invention results in a lighting of predefined points, or a predefined pattern on the projection lens in the lighting module presented here. A statistically distributed diffusion on a surface area of the diffusion surface according to the invention results in a particularly finely distributed, diffused lighting of the projection lens in the lighting module presented here.

A second aspect of the invention presented here relates to a lighting method for generating two different lighting effects. The lighting method comprises a first step in which the light beams from at least one light source are directed onto a first primary optical element, such that the light from the at least one light source is diffused by a diffusion surface in the first primary optical element, and lights a projection lens homogenously for a first lighting effect, in which light beams from the at least one light source are reflected by a first reflector onto a second reflector in the first primary optical element to direct light from the at least one light source striking a boundary area between the diffusion surface an another section through the diffusion surface onto the projection lens, and a second step in which the light beams from the at least one light source are directed to a second primary optical element, such that the light beams from the at least one light source are directed through the projection lens for a second lighting effect.

The lighting method presented here is used in particular to operate the lighting module presented here.

A third aspect of the invention presented here relates to a vehicle that contains an embodiment of the lighting module presented here. The vehicle and/or lighting module can contain a control unit, with which light is directed through either the first primary optical element or second primary optical element, depending on the current operating mode of the vehicle. The control unit can be configured in particular to light the first primary optical element for a low beam setting, and the second primary optical element for a high beam setting. The control unit can be configured to activate or deactivate a first light for the first primary optical element, or a second light for the second primary optical element.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
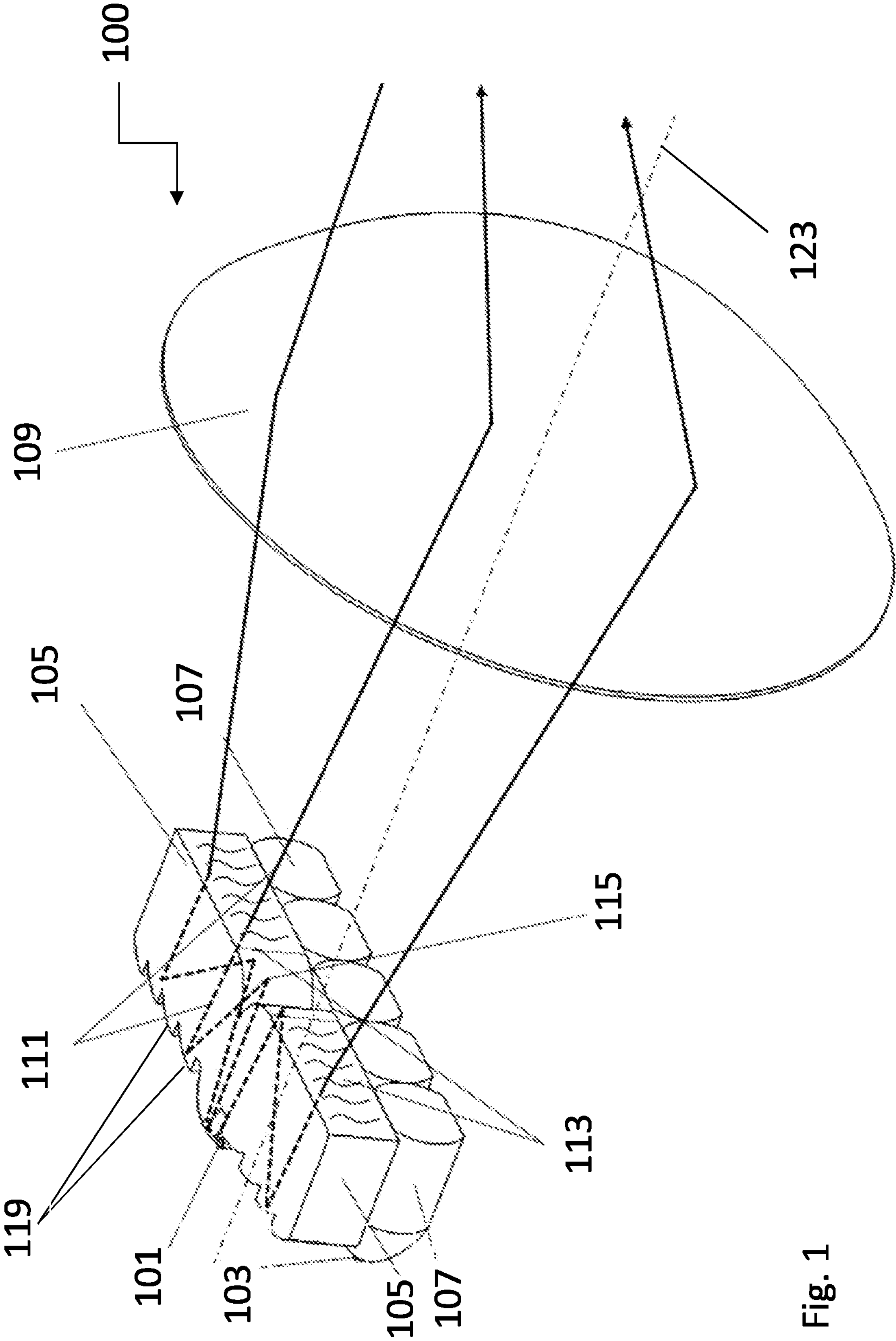
FIG. 1 shows a schematic illustration of one possible embodiment of the lighting module presented herein, in a perspective view.

A lighting module 100 is shown in FIG. 1. The lighting module 100 comprises a first light source 101, a second light source 103, a first primary optical element 105, a second primary optical element 107, and a projection lens 109.

The first light source 101 is activated in FIG. 1, such that light beams 111 enter the first primary optical element 105. Some of light beams 111 from the first light source 101 pass directly through a diffusion surface 113 onto the projection lens 109. Other light beams 111 strike a boundary area 115 comprising a first reflector 117, such that these light beams 111 are reflected onto a second reflector 119, and from the second reflector through the diffusion surface 113, onto the projection lens 109.

The diffusion surface 113 diffuses, i.e. enlarges, the cross section of an area that is lit when the light beams 111 exit the diffusion surface 113, in relation to the cross section of the area lit by the light beams 111 exiting the first light source 101. This diffusion surface 113 can contain diffracting elements that are curved, in particular with a concave shape. The entire projection lens is therefore lit by the light beams 111 particularly homogeneously. The diffusion surface 113, or the material forming the diffusion surface 113 can also be shaped such that the cross section of the area lit by the light beams 111 exiting the diffusion surface 113 is greater than the cross section of the area lit by the light beams 111 exiting the first light source 101. This diffusion surface 113 itself can also be curved, in particular concave.

Figure 2:
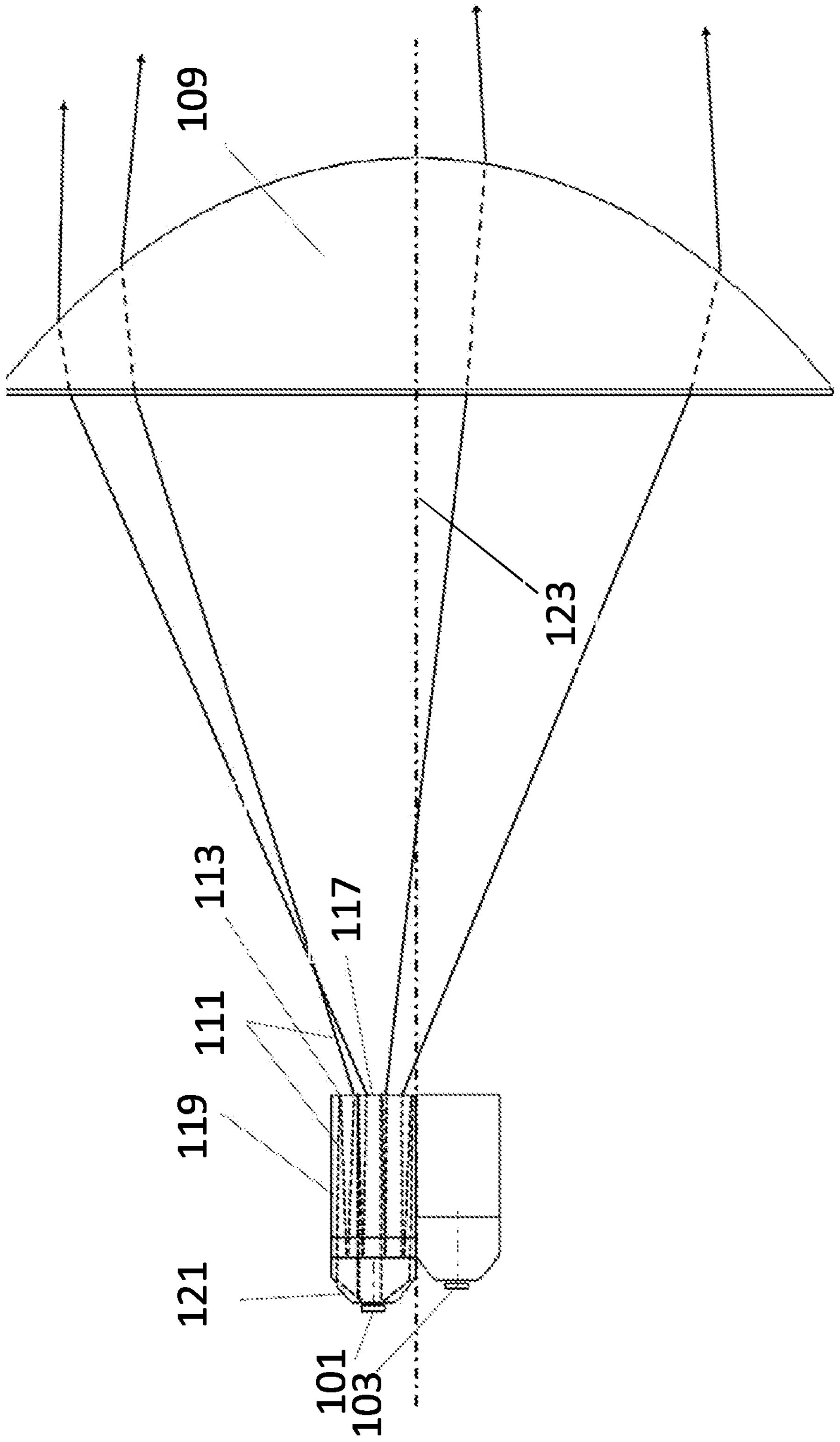
FIG. 2 shows a side view of the lighting module from FIG. 1 in a first operating mode.

The lighting module 100 is shown in a side view in FIG. 2, in which light strikes the first primary optical element 105, thus generating a first lighting effect. It is clear here that the light beams 111 exiting the first primary optical element 105 light a very large area, such that light strikes the entire projection lens 109.

It is clear in particular that light beams 111 exiting the first primary optical element 105 are initially parallel to a boundary line 123 between the first primary optical element 105 and the second primary optical element 107 due to collimators 121 in front of the first primary optical element 105, and are subsequently either reflected or exit the first primary optical element 105, abandoning the parallel path, such that some of them intersect the boundary line 123.

Figure 3:
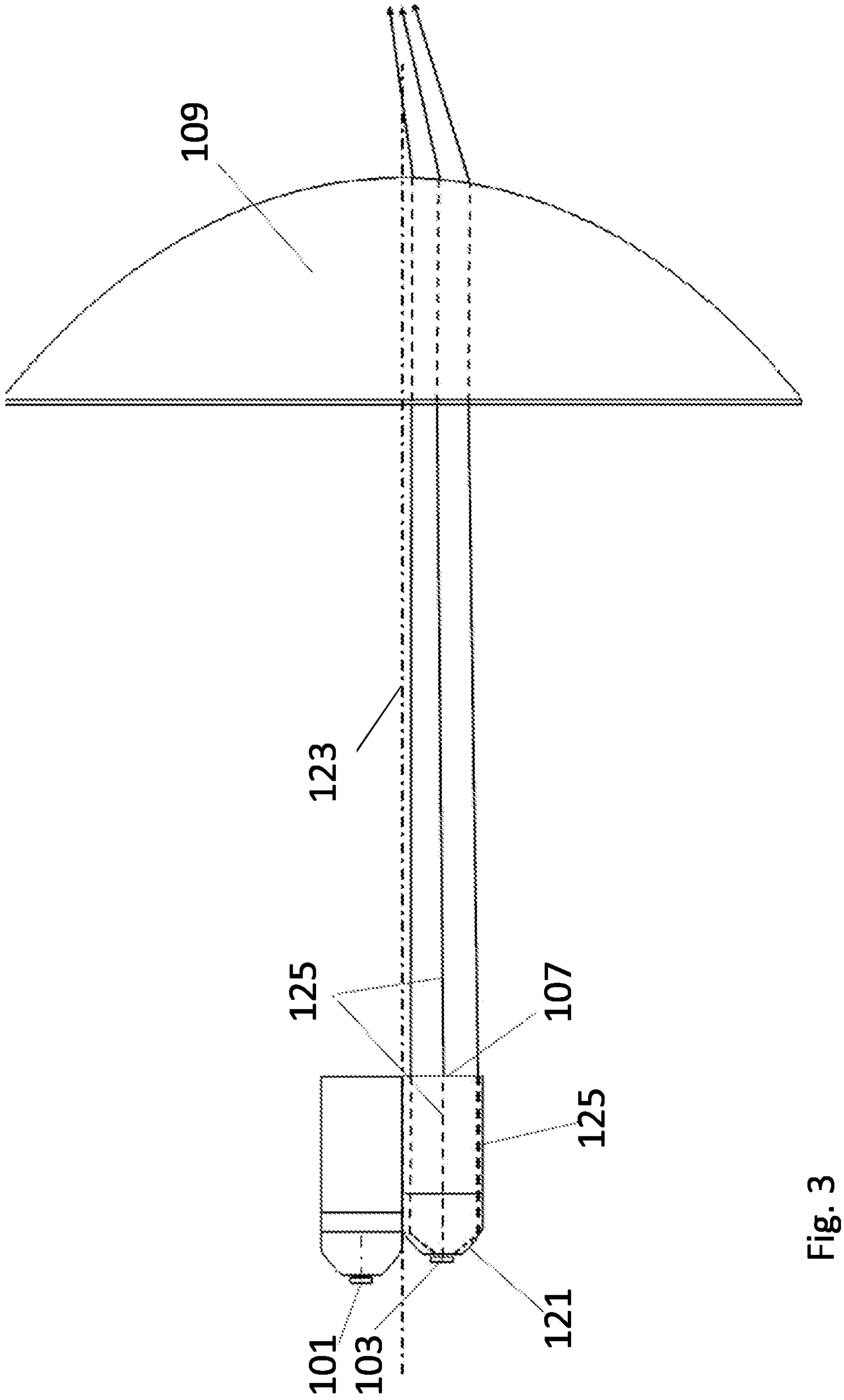
FIG. 3 shows a side view of the lighting module from FIG. 1 in a second operating mode.

The lighting module 100 is shown in a side view in FIG. 3, in which light strikes the second primary optical element 107, thus generating a second lighting effect, which is different from the first lighting effect shown in FIG. 2. It can be seen here that the light beams 125 exiting the second primary optical element 107 light a focused, small part of the projection lens 109, such that very bright light only strikes a small part of the projection lens 109, as is typical for a high beam setting, for example.

Figure 4:
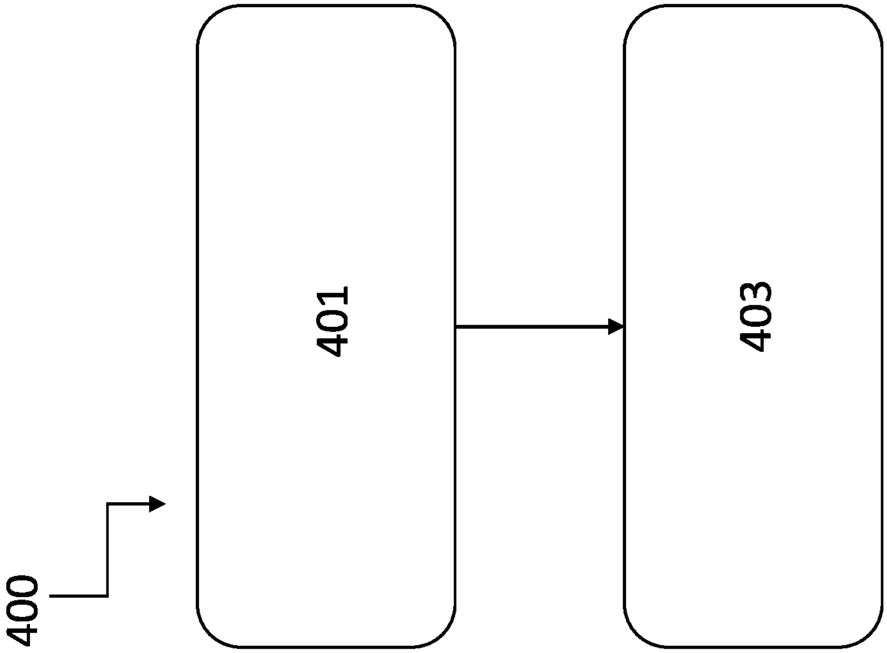
FIG. 4 shows a schematic illustration of one possible design of the lighting method presented herein.

A lighting method 400 for generating two different lighting effects is shown in FIG. 4. The lighting method 400 uses the lighting module 100 and comprises a first step 401, in which light beams from at least one light source are directed toward a first primary optical element, such that the light beams from the at least one light source are diffused by a diffusion surface in the first primary optical element, and homogenously light a projection lens for a first lighting effect in which the light beams from the at least one light source are reflected by a first reflector in the first primary optical element onto a second reflector in the first primary optical element in order to direct the light beams from the at least one light source striking a boundary area between the diffusion surface and another section through the diffusion surface onto the projection lens, and a second step 403, in which the light beams from the at least one light source are directed toward a second primary optical element such that the light beams from the at least one light source are directed through the projection lens for a second lighting effect.

Figure 5:
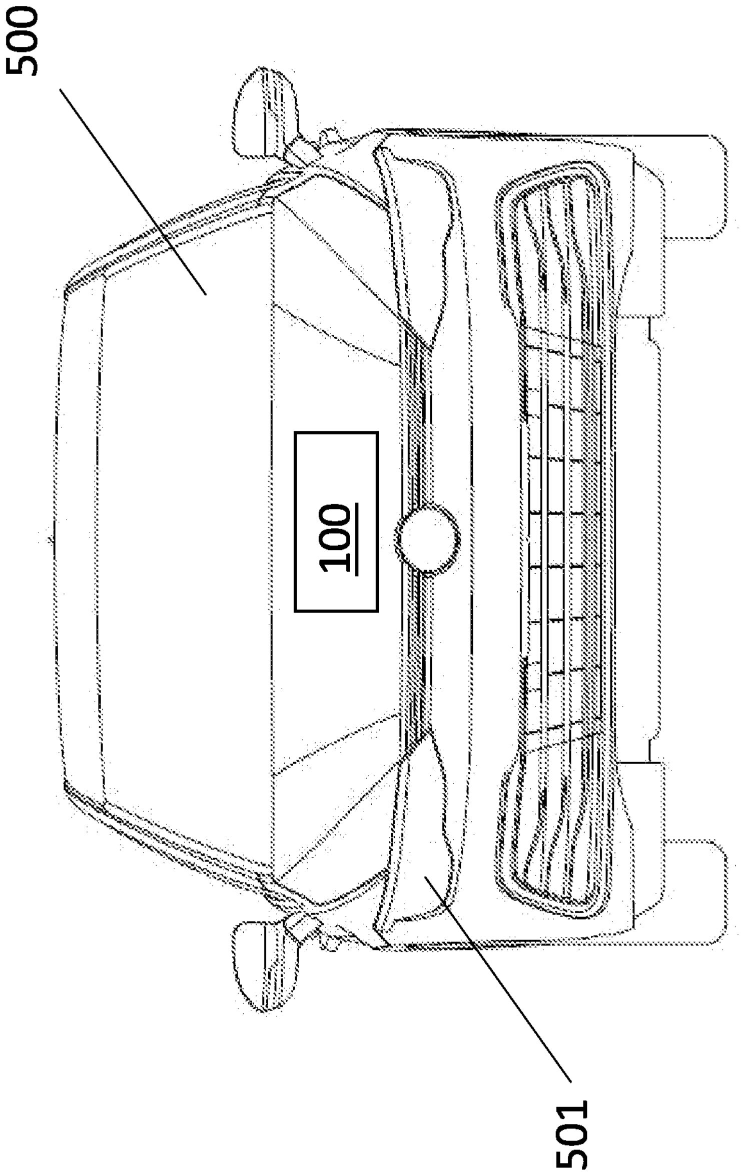
FIG. 5 shows a schematic illustration of one possible embodiment of the vehicle presented herein.

A vehicle 500 is shown in FIG. 5. The vehicle 500 contains the lighting module 100. A lighting surface 501 on the front of the vehicle 500 formed by the projection lens 109 can project a diffused light with an intensity corresponding to a low beam effect, or a supplementary lighting effect for distinguishing traffic signs, or a focused light with an intensity corresponding to a high beam effect, for example.

LIST OF REFERENCE SYMBOLS

100 lighting module
101 first light source
103 second light source
105 first primary optical element
107 second primary optical element
109 projection lens
111 light beams
113 diffusion surface
115 boundary area
117 first reflector
119 second reflector
121 collimator
123 boundary line
125 light beams
400 lighting method
401 first step
403 second step
500 vehicle
501 lighting surface

We claim:

1. A lighting module for generating two different lighting effects, the lighting module comprising:
at least one light source,
a first primary optical element including a diffusion surface diffusing light from the at least one light source, the first primary optical element also including a first reflector and second reflector,
a second primary optical element, and
a projection lens, wherein the light diffused by the first primary optical element homogenously lights the projections lens for a first lighting effect,
wherein the first reflector reflects light beams from the at least one light source in a boundary area of the first primary optical element onto the second reflector to direct said light beams through the diffusion surface onto the projection lens,
wherein the second primary optical element directs light beams from the at least one light source onto the projection lens to light the projection lens for a second lighting effect, and
wherein the lighting module directs light beams from the at least one light source exclusively through the first primary optical element for the low beam effect and directs light beams from the at least one light source exclusively through the second primary optical element for the high beam effect.

2. The lighting module according to claim 1, wherein the first reflector forms the boundary area.

3. The lighting module according to claim 1, wherein the first reflector and/or the second reflector reflect the light beams from the at least one light source in a total reflection.

4. The lighting module according to claim 1, wherein the at least one light source includes a first light unit for lighting the first primary optical element and a second light unit for lighting the second primary optical element.

5. The lighting module according to claim 1, wherein the at least one light source contains at least one collimator narrowing the light beams from the at least one light source prior to entering the first primary optical element such that the light beams strike the boundary area and diffusion surface, wherein the first reflector and second reflector expand the light beams striking the boundary area as they pass through the first primary optical element to homogenously light the entire projection lens for the first lighting effect.

6. The lighting module according to claim 1, wherein the diffusion surface diffuses the light beams from the at least one light source such that they homogenously light the entire projection lens.

7. The lighting module according to claim 1, wherein the diffusion surface has a surface area with a predefined or statistically distributed diffusion effect.

8. A lighting method for generating two different lighting effects, the lighting method comprising the steps of:

directing light beams from a first light source exclusively through a first primary optical element for a first lighting effect;

diffusing the light beams from the first light source by a diffusion surface in the first primary optical element;

homogenously lighting a projection lens for the first lighting effect with the diffused light beams, wherein the light beams from the first light source are reflected by a first reflector in the first primary optical element onto a second reflector in the first primary optical element, to direct the light beams from the first light source in a boundary area of the first primary optical element through the diffusion surface onto the projection lens; and directing light beams from a second light source exclusively through a second primary optical element for a second lighting effect, such that the light beams from the second light source are directed toward the projection lens, to light the projection lens with the second lighting effect.

9. A vehicle comprising a lighting module according to claim 1.

* * * * *